(12) United States Patent
Kamatani

(10) Patent No.: US 8,587,346 B2
(45) Date of Patent: Nov. 19, 2013

(54) DRIVING CIRCUIT AND ELECTRONIC DEVICE USING THE SAME

(75) Inventor: Tomohiko Kamatani, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 147 days.

(21) Appl. No.: 11/523,113

(22) Filed: Sep. 18, 2006

(65) Prior Publication Data

US 2007/0069712 A1  Mar. 29, 2007

(30) Foreign Application Priority Data

Sep. 28, 2005  (JP) ................. 2005-281801

(51) Int. Cl.
| | |
|---|---|
| H03K 3/00 | (2006.01) |
| G09G 3/28 | (2013.01) |
| G09G 3/32 | (2006.01) |
| G05F 3/16 | (2006.01) |

(52) U.S. Cl.
USPC ............. 327/108; 345/60; 345/82; 345/83; 323/315

(58) Field of Classification Search
USPC ............ 327/108; 345/60; 323/315; 315/307, 315/224
See application file for complete search history.

(56) References Cited

U.S. PATENT DOCUMENTS

| | | | | |
|---|---|---|---|---|
| 4,967,192 A | * | 10/1990 | Hirane et al. ................. | 345/211 |
| 6,822,403 B2 | * | 11/2004 | Horiuchi et al. .............. | 315/307 |
| 7,326,921 B2 | * | 2/2008 | Matsumoto .................... | 250/238 |
| 7,327,170 B2 | * | 2/2008 | Omori et al. ................... | 327/108 |
| 7,436,378 B2 | * | 10/2008 | Ito et al. .......................... | 345/82 |
| 7,459,959 B2 | * | 12/2008 | Rader et al. .................... | 327/536 |
| 2001/0028273 A1 | | 10/2001 | Minamizaki et al. | |
| 2002/0021150 A1 | * | 2/2002 | Tuchiya et al. ................ | 327/108 |
| 2004/0017725 A1 | * | 1/2004 | Mas et al. ....................... | 365/222 |
| 2005/0231241 A1 | * | 10/2005 | Date et al. ...................... | 327/108 |
| 2006/0119551 A1 | * | 6/2006 | Chaussy et al. ................. | 345/76 |
| 2009/0121750 A1 | * | 5/2009 | Tanaka ........................... | 327/108 |

FOREIGN PATENT DOCUMENTS

| | | |
|---|---|---|
| CN | 1627223 A | 6/2005 |
| JP | 11-42809 | 2/1999 |
| JP | 2002-343585 | 11/2002 |
| JP | 2003-332624 | 11/2003 |

OTHER PUBLICATIONS

Oct. 24, 2008 Chinese official action (and English translation thereof) in connection with a counterpart Chinese patent application No. 200610159333.4.

Mar. 8, 2011 Chinese official action (with English translation) in connection with a counterpart Chinese patent application.

* cited by examiner

Primary Examiner — Lincoln Donovan
Assistant Examiner — Colleen O Toole
(74) Attorney, Agent, or Firm — Cooper & Dunham LLP

(57) ABSTRACT

A driving circuit is disclosed that has low power consumption and supplies a current to a load. The driving circuit includes a constant current circuit section to generate and output a predetermined constant current, a current mirror circuit section to generate a current proportional to an input current supplied from the constant current circuit section and supply the current to the load, and a constant voltage supplying circuit section to generate a constant voltage and supply the constant voltage to a series circuit of the load and an output transistor of the current mirror circuit. The constant voltage supplying circuit section gene-rates the constant voltage so that an output voltage of the current mirror circuit section equals an input voltage of the current mirror circuit section.

20 Claims, 5 Drawing Sheets

DRIVING CIRCUIT AND ELECTRONIC DEVICE USING THE SAME

BACKGROUND

1. Technical Field

This disclosure generally relates to a driving circuit for supplying a current to a load, such as a light emission diode (LED) to drive the load, and an electronic device using such a driving circuit.

2. Description of the Related Art

A light emission element, such as a light emission diode (LED), is used as a back light of a liquid crystal display unit in a cellular phone.

FIG. 5 is a circuit diagram illustrating an example of a configuration of a driving circuit for driving a LED in the related art.

As showing in FIG. 5, a driving circuit 101 is used to drive a series of LEDs Le1 through Len (n is an integer greater than 1). The driving circuit 101 includes plural constant-current drivers Dri1 through Drin, which are connected to the LEDs Le1 through Len, respectively, a voltage comparator 102, and a DC-DC converter 103.

Each constant-current driver Drik (k=1, . . . , n) includes a constant current source CSok (k=1, . . . , n) and a current mirror circuit CMok (k=1, . . . , n).

The DC-DC converter 103 is connected to anodes of the LED series Le1 through Len, and supplies a voltage Vh0 to the serial circuits each including one of the LEDs Le1 through Len and an output transistor of one of the current mirror circuits CMo1 through CMon corresponding to the above one LED.

The voltage comparator 102 compares respective output voltages V1 through Vn of the current mirror circuits CMo1 through CMon, selects and outputs the lowest voltage Vlow. The DC-DC converter 103 adjusts the output voltage Vh0 so that the lowest voltage Vlow output from the voltage comparator 102 becomes equal to a reference voltage Vref, and thereby, maintaining the output voltage Vh0 to be constant.

Here, because fluctuations occur in characteristics of the LEDs constituting the LED series Le1 through Len, the output currents of the constant current source CSo1 through CSon, and characteristics of the current mirror circuit CMo1 through CMon, the voltages V1 through Vn also fluctuate. Therefore, in order that the constant-current drivers Dri1 through Drin carry out constant-current operations reliably, the reference voltage Vref is set while taking into consideration the maximum possible fluctuation of the LEDs, the constant current source CSo1 through CSon, and the current mirror circuit CMo1 through CMon.

In the driving circuit 101 as shown in FIG. 5, the output voltage Vh0 is adjusted so that the lowest voltage Vlow among the output voltages V1 through Vn of the current mirror circuits CMo1 through CMon becomes equal to the reference voltage Vref, and thereby, all of the LEDs can sufficiently emit light even though there exist fluctuations in characteristics of the LEDs.

In the related art, for example, Japanese Laid Open Patent Application No. 2003-332624 discloses a device for driving light emission elements in which the lowest voltage among the voltages applied to plural constant-current drivers connected to respective plural light emission element series is selected as a detection voltage, and the output voltage of a power supplier circuit is automatically adjusted so that the detection voltage becomes a sufficiently low voltage allowing the constant current operation of the constant current driver.

However, in the driving circuit of the related art, since the reference voltage Vref of the DC-DC converter 103 is set while taking into consideration the maximum possible fluctuations of the characteristics of the LEDs, the output currents of the constant current source CSo1 through CSon, and the characteristics of the current mirror circuit CMo1 through CMon, sometimes the output voltage Vh0 of the DC-DC converter 103 becomes unnecessarily high. Due to this, the electrical efficiency of the DC-DC converter 103 is degraded, and as a result, the power consumption of the total driving circuit becomes high.

SUMMARY

A preferred embodiment of the present invention may provide a driving circuit of low power consumption for supplying a current to a load, and an electronic device having the driving circuit.

According to a first aspect of the present invention, there is provided a driving circuit for supplying a current to a load, comprising:

a constant current circuit section configured to generate and output a predetermined constant current;

a current mirror circuit section configured to generate a current proportional to an input current supplied from the constant current circuit section, and supply the current to the load; and a constant voltage supplying circuit section configured to generate a constant voltage and supplies the constant voltage to a series circuit of the load and an output transistor of the current mirror circuit, wherein the constant voltage supplying circuit section generates the constant voltage so that an output voltage of the current mirror circuit section equals an input voltage of the current mirror circuit section.

According to a second aspect of the present invention, there is provided a driving circuit for supplying currents to a plurality of loads, comprising:

a plurality of constant current circuit sections each configured to generate and output a predetermined constant current;

a plurality of current mirror circuit sections each configured to generate currents respectively proportional to input currents output from the constant current circuit sections, respectively, and supply the currents to the loads, respectively; and a constant voltage supplying circuit section configured to generate a constant voltage and supply the constant voltage to the loads, wherein the constant voltage supplying circuit section generates the constant voltage so that a lowest output voltage of the current mirror circuit sections equals a highest input voltage of the current mirror circuit sections.

As an embodiment, the constant voltage supplying circuit section comprises:

a first voltage comparison circuit section configured to compare output voltages of the current mirror circuit sections, and select and output the lowest output voltage;

a second voltage comparison circuit section configured to compare input voltages of the current mirror circuit sections, and select and output the highest input voltage; and a constant voltage circuit section configured to generate the constant voltage so that the output voltage from the first voltage comparison circuit section equals the output voltage of the second voltage comparison circuit section.

As an embodiment, each of the constant current circuit sections generates and outputs the constant current according to a signal input from outside.

As an embodiment, each of the constant current circuit sections comprises:

a DA converter configured to convert a digital signal input from outside into an analog signal and output the analog signal;

a voltage-current converter configured to convert a voltage of an output signal from the DA converter to a current.

As an embodiment, the constant voltage supplying circuit section comprises:

a comparison circuit section configured to compare output voltages of the current mirror circuit sections, and select and output the lowest output voltage;

a signal comparison circuit section configured to compare values of the digital signals input to the DA converters of the constant current circuit sections, and select a digital signal having a maximum value, generate and output a voltage corresponding to the maximum value; and a constant voltage circuit section configured to generate the constant voltage so that the output voltage from of the voltage comparison circuit section equals the output voltage of the signal comparison circuit section.

As an embodiment, the constant voltage supplying circuit section comprises:

a voltage comparison circuit section configured to compare output voltages of the current mirror circuit sections, and select and output the lowest output voltage;

a signal comparison circuit section configured to compare values of the digital signals input to the DA converters of the constant current circuit sections, and output an input voltage corresponding to the digital signal indicating the maximum value; and a constant voltage circuit section configured to generate the constant voltage so that the output voltage from of the voltage comparison circuit section equals the output voltage of the signal comparison circuit section.

As an embodiment, the constant current circuit section, the current mirror circuit section, and the constant voltage supplying circuit section are integrated into one chip.

As an embodiment, the constant current circuit sections, the current mirror circuit sections, and the constant voltage supplying circuit section are integrated into one chip.

According to a third aspect of the present invention, there is provided an electronic device having a driving circuit for supplying a current to a load, wherein
the driving circuit comprises:

a constant current circuit section configured to generate and output a predetermined constant current;

a current mirror circuit section configured to generate a current proportional to an input current supplied from the constant current circuit section, and supply the current to the load; and a constant voltage supplying circuit section configured to generate a constant voltage and supply the constant voltage to a series circuit of the load and an output transistor of the current mirror circuit, wherein
the constant voltage supplying circuit section generates the constant voltage so that an output voltage of the current mirror circuit section equals an input voltage of the current mirror circuit section.

According to a fourth aspect of the present invention, there is provided an electronic device having a driving circuit for supplying currents to a plurality of loads, wherein
the driving circuit comprises:

a plurality of constant current circuit sections each configured to generate and output a predetermined constant current;

a plurality of current mirror circuit sections each configured to generate currents respectively proportional to input currents output from the constant current circuit sections, respectively, and supply the currents to the loads, respectively; and a constant voltage supplying circuit section configured to generate a constant voltage and supply the constant voltage to the loads, wherein
the constant voltage supplying circuit section generates the constant voltage so that a lowest output voltage of the current mirror circuit sections equals a highest input voltage of the current mirror circuit sections.

As an embodiment, the constant voltage supplying circuit section comprises:

a first voltage comparison circuit section configured to compare output voltages of the current mirror circuit sections, and select and output the lowest output voltage;

a second voltage comparison circuit section configured to compare input voltages of the current mirror circuit sections, and select and output the highest input voltage; and a constant voltage circuit section configured to generate the constant voltage so that the output voltage from of the first voltage comparison circuit section equals the output voltage of the second voltage comparison circuit section.

As an embodiment, each of the constant current circuit sections generates and outputs the constant current according to a signal input from outside.

As an embodiment, each of the constant current circuit sections comprises:

a DA converter configured to convert a digital signal input from outside into an analog signal and output the analog signal;

a voltage-current converter configured to convert a voltage of an output signal from the DA converter to a current.

As an embodiment, the constant voltage supplying circuit section comprises:

a comparison circuit section configured to compare output voltages of the current mirror circuit sections, and select and output the lowest output voltage;

a signal comparison circuit section configured to compare values of the digital signals input to the DA converters of the constant current circuit sections, and select a digital signal having a maximum value, generate and output a voltage corresponding to the maximum value; and a constant voltage circuit section configured to generate the constant voltage so that the output voltage from of the voltage comparison circuit section equals the output voltage of the signal comparison circuit section.

As an embodiment, the constant voltage supplying circuit section comprises:

a voltage comparison circuit section configured to compare output voltages of the current mirror circuit sections, and select and output the lowest output voltage;

a signal comparison circuit section configured to compare values of the digital signals input to the DA converters of the constant current circuit sections, and output an input voltage corresponding to the digital signal indicating the maximum value; and a constant voltage circuit section configured to generate the constant voltage so that the output voltage from of the voltage comparison circuit section equals the output voltage of the signal comparison circuit section.

As an embodiment, the constant current circuit section, the current mirror circuit section, and the constant voltage supplying circuit section are integrated into one chip.

As an embodiment, the constant current circuit sections, the current mirror circuit sections, and the constant voltage supplying circuit section are integrated into one chip.

According to the present invention, in the driving circuit, the constant current circuit section generates and outputs the constant current, the current mirror circuit section generates a current proportional to an input current supplied from the constant current circuit section and supplies the current to the load, and the constant voltage supplying circuit section generates the constant voltage and supplies the constant voltage to a series circuit of the load and the output transistor of the current mirror circuit, and the constant voltage supplying circuit section generates the constant voltage so that the output voltage of the current mirror circuit section equals the input voltage of the current mirror circuit section. Therefore, it is possible to reduce power consumption in the driving circuit.

These and other aspects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

First Embodiment

Figure 1:
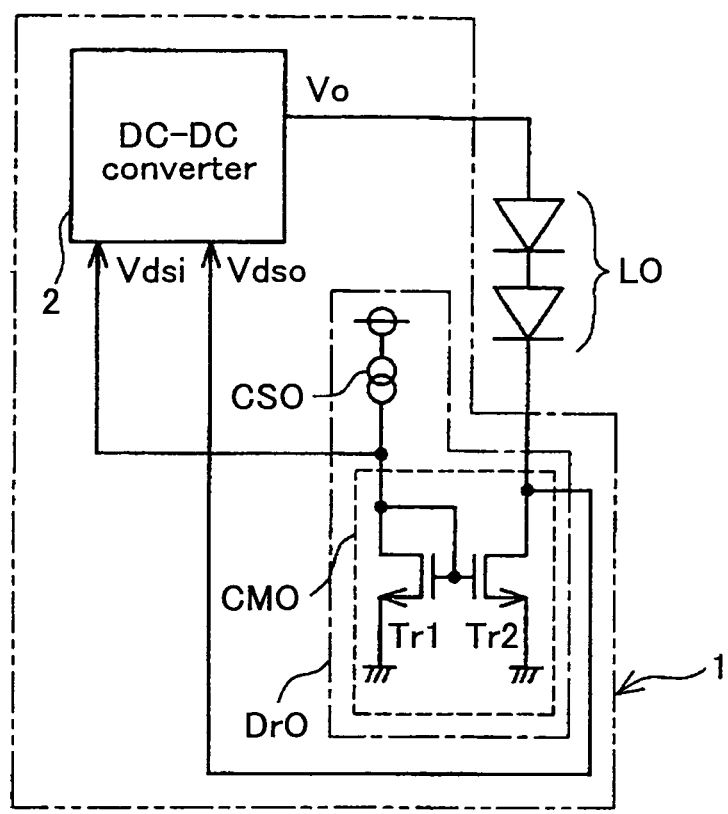
FIG. 1 is a circuit diagram illustrating an example of a driving circuit according to a first embodiment of the present invention.

FIG. 1 is a circuit diagram illustrating an example of a driving circuit according to a first embodiment of the present invention.

As showing in FIG. 1, a driving circuit 1 includes a constant-current driver Dr0, and a DC-DC converter 2. The constant-current driver Dr0 includes a constant current source CS0 and a current mirror circuit CM0. The current mirror circuit CM0 includes two NMOS transistors Tr1 and Tr2. The gates of the two NMOS transistors Tr1 and Tr2 are connected with each other, and the connection site of the two gates is connected to the drain of the NMOS transistor Tr1. The sources of the two NMOS transistors Tr1 and Tr2 are grounded. The constant current source CS0 supplies a constant current to the drain of the NMOS transistor Tr1, and the drain of the NMOS transistor Tr2 is connected to the cathode side of a LED series L0, which LED series includes one or more LEDs connected in series, and forms a load.

Here, the constant-current driver Dr0 and the DC-DC converter 2 are integrated together into one IC chip. The constant current source CS0 corresponds to the constant current circuit section, the current mirror circuit CM0 corresponds to the current mirror circuit section, and the DC-DC converter 2 corresponds to the constant voltage supplying circuit section in claims of the present application.

The input voltage Vdsi and the output voltage Vdso of the current mirror circuit CM0 are input to the DC-DC converter 2. The DC-DC converter 2 adjusts its output voltage V0 according to the voltage Vdsi and the voltage Vdso so that the output voltage V0 is constant. Specifically, the DC-DC converter 2 adjusts the output voltage V0 so that the output voltage Vdso equals the input voltage Vdsi of the current mirror circuit CM0, and outputs the voltage V0 to the anode side of the LED series L0.

Figure 2:
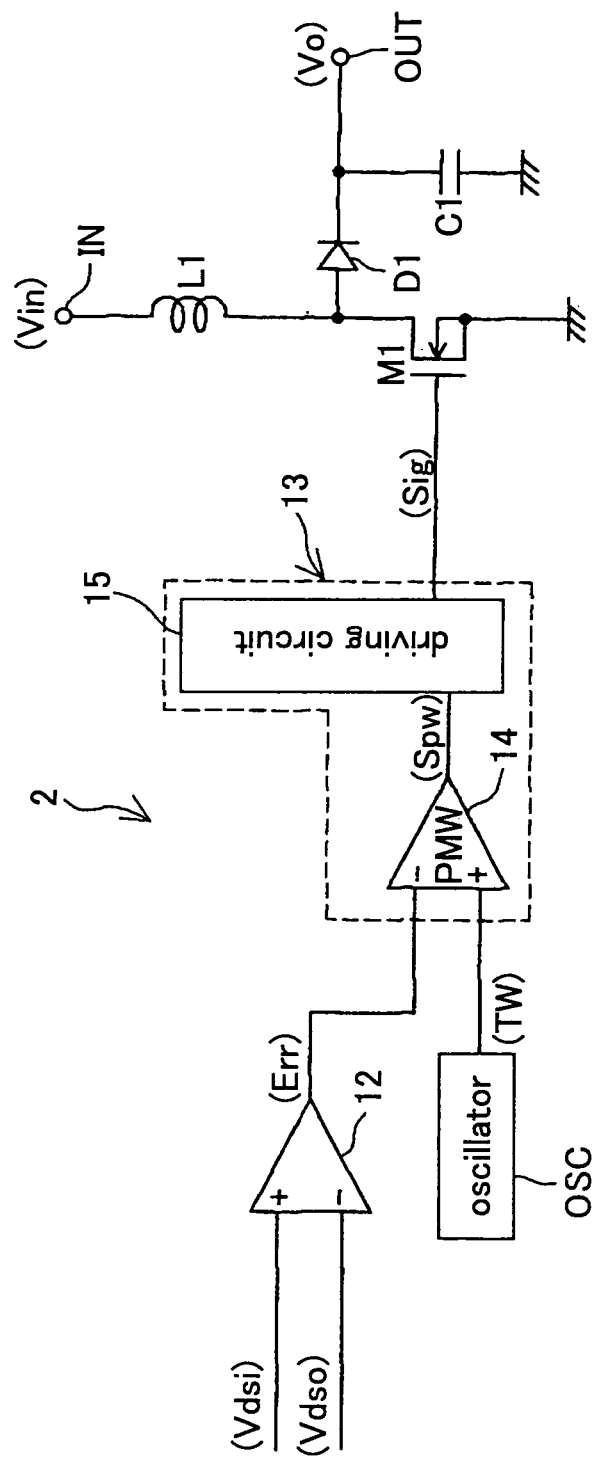
FIG. 2 is a circuit diagram exemplifying a configuration of the DC-DC converter 2 according to the first embodiment of the present invention.

FIG. 2 is a circuit diagram exemplifying a configuration of the DC-DC converter 2 according to the first embodiment of the present invention.

As shown in FIG. 2, the DC-DC converter 2 includes an error amplifier 12 which compares the output voltage Vdso and the input voltage Vdsi of the current mirror circuit CM0, and generates an output signal Err having a voltage corresponding to the comparison results; a PWM controller 13 which performs PWM control for a switching element M1 in response to the output signal Err of the error amplifier 12 so as to control switching operations of the switching element M1; and an oscillator OSC which generates a triangular signal TW having a specified frequency, and outputs the signal TW to the PWM controller 13.

The PWM controller 13 includes a PWM circuit 14 which generates a pulse signal Spw based on the output signal Err of the error amplifier 12 and the triangular signal TW from the oscillator OSC, and outputs the pulse signal Spw for PWM control, and a driver 15 which generates a control signal Sig for switching control of the switching element M1 in response to the pulse signal Spw from the PWM circuit 14.

An inductor L1 and a diode D1 are connected in series between an input terminal IN and an output terminal OUT, and the switching element M1 is connected between ground and the connection site of the inductor L1 and the diode D1. Further, a condenser C1 is connected between the output terminal OUT and ground.

The input voltage Vdsi and the output voltage Vdso of the current mirror circuit CM0 are input to a non-inverted input terminal and an inverted input terminal of the error amplifier 12, respectively. The output signal Err of the error amplifier 12 is input to an inverted input terminal of a comparator, which constitutes the PWM circuit 14, and the triangular signal TW from the oscillator OSC is input to a non-inverted input terminal of the comparator constituting the PWM circuit 14. The pulse signal Spw from the PWM circuit 14 is output to the driver 15. The driver 15 outputs the control signal Sig to the gate of the switching element M1 for switching control of the switching element M1.

In the above configuration, when the switching element M1 is turned ON, a current is supplied to the inductor L1; when the switching element M1 is turned OFF, the energy stored in the inductor L1 is added to the input voltage Vin, and the resulting voltage is output to the diode D1; this signal is rectified by the diode D1, smoothed by the condenser C1, and then is output through the output terminal OUT.

When the output voltage Vdso of the current mirror circuit CM0 decrease, for example, due to a voltage drop on the LED series L0, and the difference between the input voltage Vdsi and the output voltage Vdso of the current mirror circuit CM0 increases, the output signal Err of the error amplifier 12 increases, and the duty cycle of the pulse signal Spw from the PWM circuit 14 decreases. Due to this, the period when the switching element M1 is ON becomes short, and accordingly, the output voltage V0 of the DC-DC converter 2 is adjusted to be high.

When the difference between the input voltage Vdsi and the output voltage Vdso of the current mirror circuit CM0 decreases, the reverse operations are carried out, and as a result, the output voltage V0 of the DC-DC converter 2 is adjusted to be constant.

As described above, in the driving circuit 1 of the present embodiment, the output voltage V0 of the DC-DC converter 2 is adjusted so that the output voltage Vdso and the input voltage Vdsi of the current mirror circuit CM0 are equal to each other.

The input voltage Vdsi and the output voltage Vdso of the current mirror circuit CM0 correspond to the source-drain voltages Vds1, Vds2 of the NMOS transistors TR1, TR2, which form the current mirror circuit CM0.

Here, according to the current-voltage characteristics of a transistor, when the source-drain voltage Vds of a transistor exceeds a certain threshold value Vth, the source-drain current Ids is saturated. That is, if the source-drain voltage Vds is higher than a certain value, even when the source-drain voltage Vds changes more or less, the source-drain current Ids essentially does not have an error (variation). Thus, the source-drain voltage Vds1 of the NMOS transistor TR1 is maintained to be higher than the threshold value Vth so that the NMOS transistor TR1 works in the saturated region.

In the driving circuit 1 of the present embodiment, by comparing the output voltage Vdso and the input voltage Vdsi of the current mirror circuit CM0, it is possible to control the output voltage V0 of the DC-DC converter 2 according to the magnitude of the actual fluctuation of the output current of the constant current source CS0. Due to this, with the driving circuit 1 of the present embodiment, it is possible to prevent degradation of the power efficiency of the DC-DC converter 2 without setting the output voltage V0 of the DC-DC converter 2 unnecessarily high; thus the power consumption of the overall driving circuit can be reduced compared to the driving circuit of the related art.

Second Embodiment

Below, a driving circuit according to a second embodiment of the present invention is described.

In the first embodiment, the driving circuit drives a single LED series. In the second embodiment, the driving circuit drives plural LED series.

Figure 3:
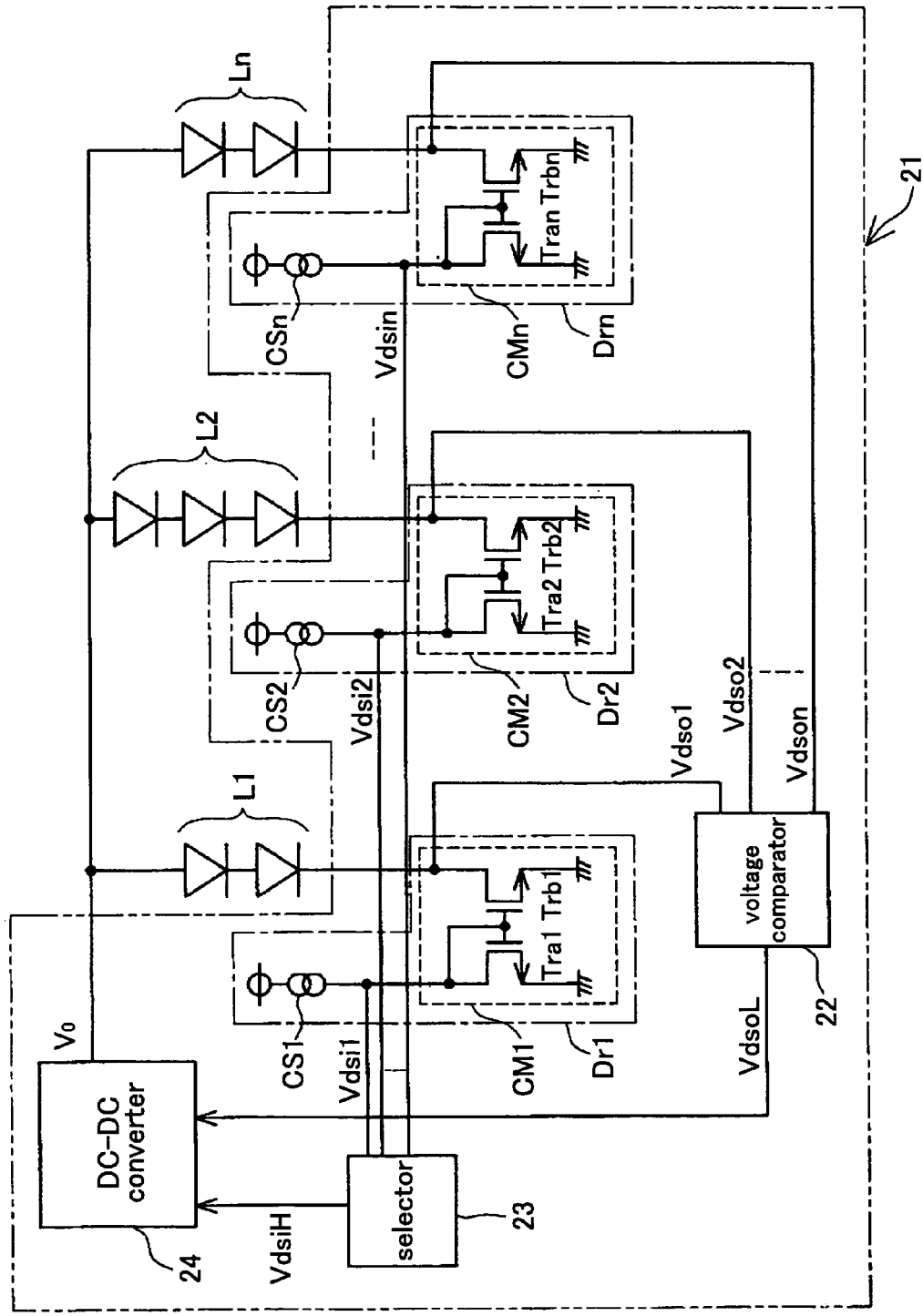
FIG. 3 is a circuit diagram illustrating an example of a driving circuit according to the second embodiment of the present invention.

FIG. 3 is a circuit diagram illustrating an example of a driving circuit according to the second embodiment of the present invention.

As shown in FIG. 3, a driving circuit 21 includes plural constant-current drivers Dr1 through Drn, which are connected to LED series L1 through Ln, respectively, a voltage comparator 22, a selector 23, and a DC-DC converter 24.

Each constant-current driver Drk (k=1, . . . , n) includes a constant current source CSk (k=1, . . . , n) and a current mirror circuit CMk (k=1, . . . , n). The current mirror circuit CMk includes two NMOS transistors Trak and Trbk. The gates of the two NMOS transistors Trak and Trbk are connected to each other, and the connection site of the two gates is connected to the drain of the NMOS transistor Trak. The sources of the two NMOS transistors Trak and Trbk are grounded. The constant current source CSk supplies a constant current to the drain of the NMOS transistor Trak, and the drain of the NMOS transistor Trbk is connected to the cathode side of a LED series Lk, which forms a load.

Here, the constant-current drivers Dr1 through Drn, the voltage comparator 22, the selector 23, and the DC-DC converter 24 are integrated together into one IC chip.

The constant current source CSk corresponds to the constant current circuit section, the current mirror circuit CMk corresponds to the current mirror circuit section, and the DC-DC converter 24 corresponds to the constant voltage circuit section in claims of the present application. Further, the voltage comparator 22 and the selector 23 correspond to the first voltage comparison circuit section and the second voltage comparison circuit section in claims of the present application, respectively. In addition, the voltage comparator 22, the selector 23, and the DC-DC converter 24 correspond to the constant voltage supplying circuit section in claims of the present application.

The voltage comparator 22 compares respective output voltages Vdso1 through Vdson of the current mirror circuits CM1 through CMn, and selects and outputs the lowest voltage VdsoL. The selector 23 compares respective input voltages Vdsi1 through Vdsin of the current mirror circuits CM1 through CMn, and selects and outputs the highest voltage VdsiH. The DC-DC converter 24 adjusts the output voltage V0 so that the voltage VdsoL from the voltage comparator 22 equals the voltage VdsiH from the selector 23, and outputs the thus obtained voltage V0 to the anodes of the LED series L1 through Ln.

The DC-DC converter 24 has the same structure as that of the DC-DC converter 2 in FIG. 2, and overlapping descriptions are omitted.

As described above, in the driving circuit 21 of the present embodiment, the lowest voltage VdsoL among the output voltages Vdso1 through Vdson of the current mirror circuits CM1 through CMn, and the highest voltage VdsiH among the input voltages Vdsi1 through Vdsin of the current mirror circuits CM1 through CMn are selected, and the lowest voltage VdsoL and the highest voltage VdsiH are compared. Due to this, it is possible to control the output voltage V0 of the DC-DC converter 24 according to the magnitude of the actual fluctuation of the output current of the constant current source CS1 through CSn. Due to this, with the driving circuit 21 of the present embodiment, it is possible to prevent degradation of the power efficiency of the DC-DC converter 24 without setting the output voltage V0 of the DC-DC converter 24 unnecessarily high; thus the power consumption of the overall driving circuit can be reduced compared to the driving circuit of the related art.

In addition, in the driving circuit 21 of the present embodiment, the input voltages Vdsik and the output voltages Vdsok of the current mirror circuits CMk are associated with the source-drain voltages of the corresponding NMOS transistors Trak and the corresponding NMOS transistors Trbk. In the driving circuit 21, since control is performed so that the lowest voltage VdsoL equals the highest voltage VdsiH, the source-drain voltages of the NMOS transistors Trak and Trbk are maintained to be higher than a certain threshold value Vth, and the NMOS transistors Trak and Trbk work in the saturated region. Hence, in the driving circuit 21 of the present embodiment, all of the constant-current drivers Dr1 through Drn work stably, and supply essentially a constant current to the LED series L1 through Ln.

It should be noted that the number of LEDs in different LED series L1 through Ln can vary. Furthermore, the number of LEDs in a LED series can be arbitrarily selected based on the required light intensity.

Third Embodiment

Below, a driving circuit according to a third embodiment of the present invention is described.

In the driving circuit of the second embodiment, the constant-current circuit section is formed by using a constant current source, which generates and outputs a certain constant current. In the driving circuit of the third embodiment, the constant-current circuit section is configured to generate and outputs a certain constant current in response to a signal from the outside. Specifically, in the driving circuit of the third embodiment, the constant-current circuit section is configured to convert a digital signal input from outside into an analog signal, convert the voltage of the analog signal to a current, and output the current signal.

Figure 4:
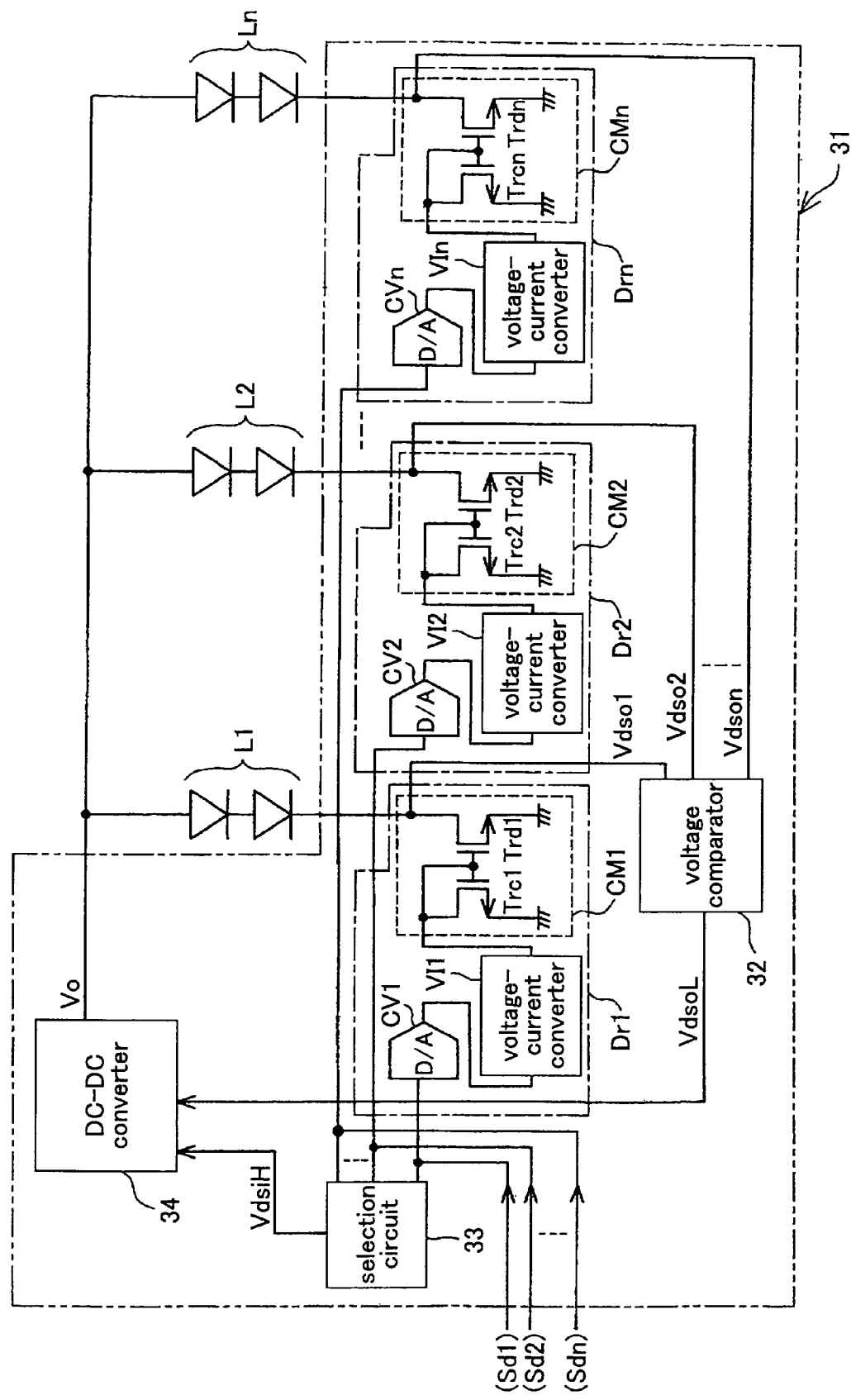
FIG. 4 is a circuit diagram illustrating an example of a driving circuit according to the third embodiment of the present invention.
Figure 5:
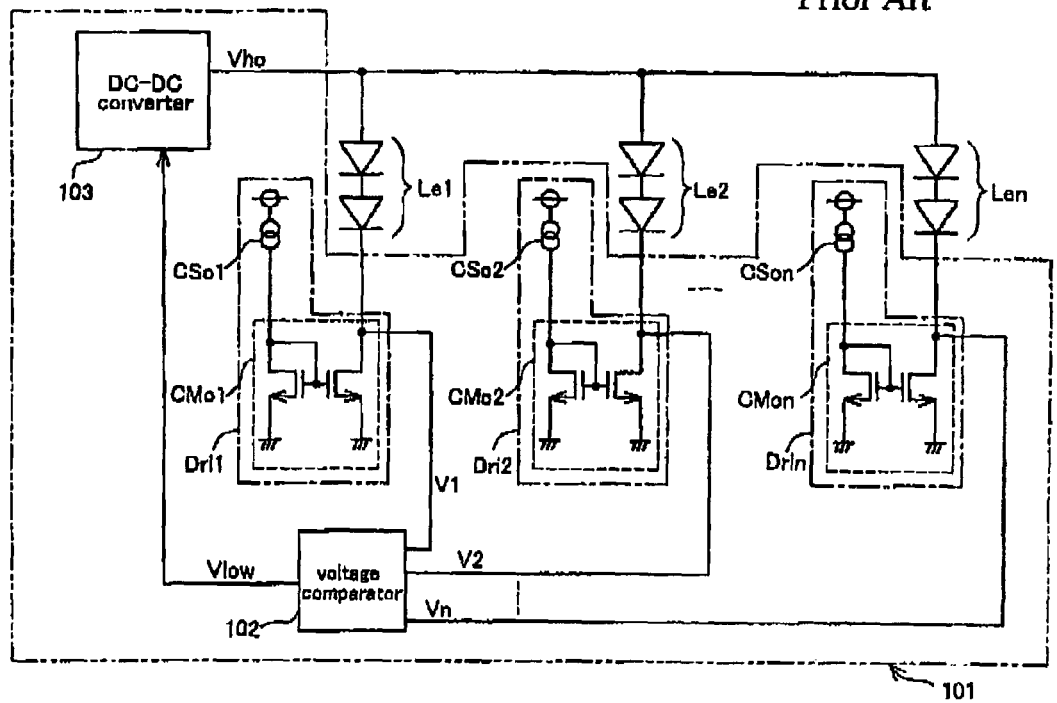
FIG. 5 is a circuit diagram illustrating an example of a configuration of a driving circuit for driving a LED in the related art.

FIG. 4 is a circuit diagram illustrating an example of a driving circuit according to the third embodiment of the present invention.

As shown in FIG. 4, a driving circuit 31 includes plural constant-current drivers Dr1 through Drn, which are connected to LED series L1 through Ln, respectively, a voltage comparator 32, a selector 33, and a DC-DC converter 34.

The driving circuit 31 of the present embodiment is different from the driving circuit 21 of the second embodiment in structures of the constant-current drivers Dr1 through Drn.

In the present embodiment, the constant-current drivers Drk (k=1, ..., n) include a D/A converter CVk, a voltage-current converter VIk, and a current mirror circuit CMk.

The current mirror circuit CMk includes two NMOS transistors Trck and Trdk. The gates of the two NMOS transistors Trck and Trdk are connected to each other, and the connection site of the two gates is connected to the drain of the NMOS transistor Trck. The sources of the two NMOS transistors Trck and Trdk are grounded.

The drain of the NMOS transistor Trck is connected to the voltage-current converter VIk, which is connected to the D/A converter CVk, and the drain of the NMOS transistor Trdk is connected to the cathode of a LED series Lk, which forms a load.

Here, the constant-current drivers Dr1 through Drn, the voltage comparator 32, the selector 33, and the DC-DC converter 34 are integrated together into one IC chip. The D/A converter CVk and the voltage-current converter VIk respectively correspond to the DA converter and the voltage-current converter in claims of the present application. The D/A converter CVk and the voltage-current converter VIk correspond to the constant current circuit section, the current mirror circuit CMk corresponds to the current mirror circuit section, and the DC-DC converter 34 corresponds to the constant voltage circuit section in claims of the present application. Further, the voltage comparator 32 and the selector 33 correspond to the first voltage comparison circuit section and the second voltage comparison circuit section in claims of the present application, respectively. In addition, the voltage comparator 32, the selector 33, and the DC-DC converter 34 correspond to the constant voltage supplying circuit section in claims of the present application.

The D/A converter CVk receives a digital signal Sdk input from the outside, converts the digital signal Sdk into an analog signal, and outputs the analog signal to the voltage-current converter VIk. The voltage-current converter VIk converts the voltage of the analog signal from the DA converter CVk to a current, and outputs the current to the input side of the corresponding current mirror circuit CMk.

The digital signals Sd1 through Sdn, which are input to the DA converter CV1 through CVn, respectively, are input to the selector 33. The selector 23 compares respective values of the digital signals Sd1 through Sdn, selects a digital signal having the maximum value, generates a voltage VdsiH corresponding to the maximum value, and outputs the voltage to the DC-DC converter 34.

The voltage comparator 32 compares respective output voltages Vdso1 through Vdson of the current mirror circuits CM1 through CMn, and selects and outputs the lowest voltage VdsoL.

The DC-DC converter 34 adjusts the output voltage V0 so that the voltage VdsoL from the voltage comparator 32 equals the voltage VdsiH from the selector 33, and outputs the thus obtained voltage V0 to the anodes of the LED series L1 through Ln.

As described above, in the driving circuit 31 of the present embodiment, similar to the driving circuit 21 of the second embodiment, since the voltage VdsoL is not compared with an unnecessarily high voltage, it is not necessary to set the output voltage V0 of the DC-DC converter 34 unnecessarily high. Due to this, it is possible to prevent degradation of the power efficiency of the DC-DC converter 34, and to reduce the power consumption of the overall driving circuit compared to the driving circuit of the related art.

In the present embodiment, it is described above that in the driving circuit 31, the selector 33 receives the digital signals Sd1 through Sdn, which are input to the DA converter CV1 through CVn, respectively, and generates a voltage corresponding to a value of a selected digital signal. However, the present embodiment is not limited to this. The selector 33 may receive both the digital signals Sd1 through Sdn and the input voltages Vdsi of the current mirror circuits CM1 through CMn, compare values of the digital signals Sd1 through Sdn, and output the input voltage corresponding to the digital signal having the maximum value.

The driving circuit of the present invention can be used to drive LSDs or other light emission elements; thus the driving circuit of the present invention can be used for a backlight of a liquid crystal display, which is used in a cellular phone or other electronic devices.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2005-281801 filed on Sep. 28, 2005, the entire contents of which are hereby incorporated by reference.

What is claimed is:

1. A driving circuit for supplying currents to a plurality of loads, comprising:

a plurality of constant current circuit sections each configured to generate and output a predetermined constant current;

a plurality of current mirror circuit sections configured to generate currents respectively proportional to input currents output from the constant current circuit sections, respectively, and supply the currents to the loads, respectively, wherein each current mirror circuit section of the plurality of current mirror circuit sections includes an output transistor;

a plurality of series circuits that are in series with the respective output transistors of the plurality of respective current mirror circuit sections; and a constant voltage supplying circuit section configured to generate a constant voltage in accordance with (a) a lowest output voltage amongst output voltages of the plurality of respective current mirror circuit sections and (b) a highest input voltage amongst input voltages of the plurality of respective current mirror circuit sections, and supply the constant voltage to the plurality of respective series circuits that are in series with the respective output transistors of the respective current mirror circuit sections, so that the lowest voltage amongst the output voltages of the plurality of respective current mirror circuit sections equals the highest input voltage amongst the input voltages of the plurality of respective current mirror circuit sections;

wherein the constant voltage supplying circuit section comprises:

a voltage comparison circuit section configured to compare the output voltages of the current mirror circuit sections, and select and output the lowest output voltage amongst the output voltages of the current mirror circuit sections;

a signal comparison circuit section configured to compare values of a plurality of digital signals input to a plurality of DA converters of respective ones of the constant current circuit sections, select one of the plurality of digital signals input to the plurality of DA converters having a maximum value, and generate and output a maximum value voltage corresponding to the maximum value of said plurality of digital signals input to the plurality of DA converters; and a constant voltage circuit section configured to generate the constant voltage so that the lowest output voltage of the voltage comparison circuit section equals the maximum value voltage of the signal comparison circuit section that corresponds to the maximum value of said plurality of digital signals input to the plurality of DA converters, the constant voltage circuit section including a switching element, an error amplifier circuit which compares the lowest output voltage of the voltage comparison circuit and the maximum value voltage output by the signal comparison circuit section, and outputs an error signal, a pulse width modulation circuit configured to receive the error signal from the error amplifier circuit and convert the error signal to a pulse signal, and a driving circuit configured to receive the pulse signal from the pulse width modulation and generate a control signal for switching control of the switching element.

2. The driving circuit as claimed in claim 1, wherein for each of the constant current circuit sections, the DA converter of the constant current circuit section is configured to convert one of the plurality of digital signals input from outside into an analog signal and output the analog signal, and wherein said each of the constant current circuit sections further comprises a voltage-current converter configured to convert a voltage of an output signal from the corresponding DA converter to a current.

3. A driving circuit for supplying currents to a plurality of loads, comprising:

a plurality of constant current circuit sections each configured to generate and output a predetermined constant current;

a plurality of current mirror circuit sections configured to generate currents respectively proportional to input currents output from the constant current circuit sections, respectively, and supply the currents to the loads, respectively, wherein each current mirror circuit section of the plurality of current mirror circuit sections includes an output transistor;

a plurality of series circuits that are in series with the respective output transistors of the plurality of respective current mirror circuit sections; and a constant voltage supplying circuit section configured to generate a constant voltage in accordance with (a) a lowest output voltage amongst output voltages of the plurality of respective current mirror circuit sections and (b) a highest input voltage amongst input voltages of the plurality of respective current mirror circuit sections, and supply the constant voltage to the plurality of respective series circuits that are in series with the respective output transistors of the respective current mirror circuit sections, so that the lowest voltage amongst the output voltages of the plurality of respective current mirror circuit sections equals the highest input voltage amongst the input voltages of the plurality of respective current mirror circuit sections;

wherein the constant voltage supplying circuit section comprises:

a voltage comparison circuit section configured to compare the output voltages of the current mirror circuit sections, and select and output the lowest output voltage amongst the output voltages of the current mirror circuit sections;

a signal comparison circuit section configured to compare values of a plurality of digital signals input to a plurality of DA converters of respective ones of the constant current circuit sections, and output a maximum value voltage corresponding to one of the plurality of digital signals input to the plurality of DA converters indicating a maximum value; and a constant voltage circuit section configured to generate the constant voltage so that the lowest output voltage of the voltage comparison circuit section equals the maximum value voltage of the signal comparison circuit section that corresponds to the maximum value of said plurality of digital signals input to the plurality of DA converters, the constant voltage circuit section including a switching element, an error amplifier circuit which compares the lowest output voltage of the voltage comparison circuit and the maximum value voltage output by the signal comparison circuit section, and outputs an error signal, a pulse width modulation circuit configured to receive the error signal from the error amplifier circuit and convert the error signal to a pulse signal, and a driving circuit configured to receive the pulse signal from the pulse width modulation and generate a control signal for switching control of the switching element.

4. An electronic device having a driving circuit for supplying currents to a plurality of loads, the driving circuit comprising:

a plurality of constant current circuit sections each configured to generate and output a predetermined constant current;

a plurality of current mirror circuit sections configured to generate currents respectively proportional to input currents output from the constant current circuit sections, respectively, and supply the currents to the loads, respectively, wherein each current mirror circuit section of the plurality of current mirror circuit sections includes an output transistor;

a plurality of series circuits that are in series with the respective output transistors of the plurality of respective current mirror circuit sections; and a constant voltage supplying circuit section configured to generate a constant voltage in accordance with (a) a lowest output voltage amongst output voltages of the plurality of respective current mirror circuit sections and (b) a highest input voltage voltages amongst input voltages of the plurality of respective current mirror circuit sections, and supply the constant voltage to the plurality of respective series circuits that are in series with the respective output transistors of the respective current mirror circuit sections, so that the lowest voltage amongst the output voltages of the plurality of respective current mirror circuit sections equals the highest input voltage amongst the input voltages of the plurality of respective current mirror circuit sections;

wherein the constant voltage supplying circuit section comprises:

a voltage comparison circuit section configured to compare the output voltages of the current mirror circuit sections, and select and output the lowest output voltage amongst the output voltages of the current mirror circuit sections;

a signal comparison circuit section configured to compare values of a plurality of digital signals input to a plurality of DA converters of respective ones of the constant current circuit sections, select one of the plurality of digital signals input to the plurality of DA converters having a maximum value, and generate and output a maximum value voltage corresponding to the maximum value of said plurality of digital signals input to the plurality of DA converters; and a constant voltage circuit section configured to generate the constant voltage so that the lowest output voltage of the voltage comparison circuit section equals the maximum value voltage of the signal comparison circuit section that corresponds to the maximum value of said plurality of digital signals input to the plurality of DA converters, the constant voltage circuit section including a switching element, an error amplifier circuit which compares the lowest output voltage of the voltage comparison circuit and the maximum value voltage output by the signal comparison circuit section, and outputs an error signal, a pulse width modulation circuit configured to receive the error signal from the error amplifier circuit and convert the error signal to a pulse signal, and a driving circuit configured to receive the pulse signal from the pulse width modulation and generate a control signal for switching control of the switching element.

5. The electronic device as claimed in claim 4, wherein each of the constant current circuit sections comprises:

a DA converter configured to convert a digital signal input from outside into an analog signal and output the analog signal; and a voltage-current converter configured to convert a voltage of an output signal from the DA converter to a current.

6. An electronic device having a driving circuit for supplying currents to a plurality of loads, the driving circuit comprising:

a plurality of constant current circuit sections each configured to generate and output a predetermined constant current;

a plurality of current mirror circuit sections configured to generate currents respectively proportional to input currents output from the constant current circuit sections, respectively, and supply the currents to the loads, respectively, wherein each current mirror circuit section of the plurality of current mirror circuit sections includes an output transistor;

a plurality of series circuits that are in series with the respective output transistors of the plurality of respective current mirror circuit sections; and a constant voltage supplying circuit section configured to generate a constant voltage in accordance with (a) a lowest output voltage amongst output voltages of the plurality of respective current mirror circuit sections and (b) a highest input voltage amongst input voltages of the plurality of respective current mirror circuit sections, and supply the constant voltage to the plurality of respective series circuits that are in series with the respective output transistors of the respective current mirror circuit sections, so that the lowest voltage amongst the output voltages of the plurality of respective current mirror circuit sections equals the highest input voltage voltages amongst the input voltages of the plurality of respective current mirror circuit sections;

wherein the constant voltage supplying circuit section comprises:

a voltage comparison circuit section configured to compare the output voltages of the current mirror circuit sections, and select and output the lowest output voltage amongst the output voltages of the current mirror circuit sections;

a signal comparison circuit section configured to compare values of a plurality of digital signals input to a plurality of DA converters of respective ones of the constant current circuit sections, and output a maximum value voltage corresponding to one of the plurality of digital signals input to the plurality of DA converters indicating a maximum value; and a constant voltage circuit section configured to generate the constant voltage so that the lowest output voltage of the voltage comparison circuit section equals the maximum value voltage of the signal comparison circuit section that corresponds to the maximum value of said plurality of digital signals input to the plurality of DA converters, the constant voltage circuit section including a switching element, an error amplifier circuit which compares the lowest output voltage of the voltage comparison circuit and the maximum value voltage output by the signal comparison circuit section, and outputs an error signal, a pulse width modulation circuit configured to receive the error signal from the error amplifier circuit and convert the error signal to a pulse signal, and a driving circuit configured to receive the pulse signal from the pulse width modulation and generate a control signal for switching control of the switching element.

7. The driving circuit as claimed in claim 3, wherein the DA converter of each of the constant current circuit sections is configured to convert one of the plurality of digital signals input from outside into an analog signal and output the analog signal, and wherein each of the constant current circuit sections comprises:

a voltage-current converter configured to convert a voltage of an output signal from the corresponding DA converter to a current.

8. The electronic device as claimed in claim 6, wherein the DA converter of each of the constant current circuit sections is configured to convert one of the plurality of digital signals input from outside into an analog signal and output the analog signal, and wherein each of the constant current circuit sections comprises:

a voltage-current converter configured to convert a voltage of an output signal from the corresponding DA converter to a current.

9. The driving circuit as claimed in claim 1, wherein the constant voltage supplying circuit section is configured to generate the constant voltage such that, for each current mirror circuit section of the plurality of current mirror circuit sections, a drain voltage of a transistor of an output side is equal to a drain voltage of a transistor of an input side.

10. The driving circuit as claimed in claim 1, wherein the constant voltage supplying circuit is configured to generate the constant voltage such that a lowest drain voltage amongst drain voltages of output side transistors of the plurality of current mirror circuit sections is equal to a highest drain voltage amongst drain voltages of input side transistors of the plurality of current mirror circuit sections.

11. The driving circuit as claimed in claim 1,
wherein the voltage comparison circuit section is configured to compare drain voltages of output side transistors of the plurality of current mirror circuit sections, and select and output a lowest drain voltage of the drain voltages of the output side transistors of the plurality of current mirror circuit sections,
wherein the signal comparison circuit section is configured to compare drain voltages of input side transistors of the plurality of current mirror circuit sections, and select and output a highest drain voltage of the drain voltages of the input side transistors of the plurality of current mirror circuit sections, and
wherein the constant voltage circuit section is configured to generate the constant voltage such that the lowest drain voltage output from the voltage comparison circuit section is equal to the highest drain voltage output from the signal comparison circuit section.

12. The driving circuit as claimed in claim 3, wherein the constant voltage supplying circuit section is configured to generate the constant voltage such that, for each current mirror circuit section of the plurality of current mirror circuit sections, a drain voltage of a transistor of an output side is equal to a drain voltage of a transistor of an input side.

13. The driving circuit as claimed in claim 3, wherein the constant voltage supplying circuit is configured to generate the constant voltage such that a lowest drain voltage amongst drain voltages of output side transistors of the plurality of current mirror circuit sections is equal to a highest drain voltage amongst drain voltages of input side transistors of the plurality of current mirror circuit sections.

14. The driving circuit as claimed in claim 3,
wherein the voltage comparison circuit section is configured to compare drain voltages of output side transistors of the plurality of current mirror circuit sections, and select and output a lowest drain voltage of the drain voltages of the output side transistors of the plurality of current mirror circuit sections,
wherein the signal comparison circuit section is configured to compare drain voltages of input side transistors of the plurality of current mirror circuit sections, and select and output a highest drain voltage of the drain voltages of the input side transistors of the plurality of current mirror circuit sections, and
wherein the constant voltage circuit section is configured to generate the constant voltage such that the lowest drain voltage output from the voltage comparison circuit section is equal to the highest drain voltage output from the signal comparison circuit section.

15. The electronic device as claimed in claim 4, wherein the constant voltage supplying circuit section is configured to generate the constant voltage such that, for each current mirror circuit section of the plurality of current mirror circuit sections, a drain voltage of a transistor of an output side is equal to a drain voltage of a transistor of an input side.

16. The electronic device as claimed in claim 4, wherein the constant voltage supplying circuit is configured to generate the constant voltage such that a lowest drain voltage amongst drain voltages of output side transistors of the plurality of current mirror circuit sections is equal to a highest drain voltage amongst drain voltages of input side transistors of the plurality of current mirror circuit sections.

17. The electronic device as claimed in claim 4,
wherein the voltage comparison circuit section is configured to compare drain voltages of output side transistors of the plurality of current mirror circuit sections, and select and output a lowest drain voltage of the drain voltages of the output side transistors of the plurality of current mirror circuit sections,
wherein the signal comparison circuit section is configured to compare drain voltages of input side transistors of the plurality of current mirror circuit sections, and select and output a highest drain voltage of the drain voltages of the input side transistors of the plurality of current mirror circuit sections, and
wherein the constant voltage circuit section is configured to generate the constant voltage such that the lowest drain voltage output from the voltage comparison circuit section is equal to the highest drain voltage output from the signal comparison circuit section.

18. The electronic device as claimed in claim 6, wherein the constant voltage supplying circuit section is configured to generate the constant voltage such that, for each current minor circuit section of the plurality of current mirror circuit sections, a drain voltage of a transistor of an output side is equal to a drain voltage of a transistor of an input side.

19. The electronic device as claimed in claim 6, wherein the constant voltage supplying circuit is configured to generate the constant voltage such that a lowest drain voltage amongst drain voltages of output side transistors of the plurality of current mirror circuit sections is equal to a highest drain voltage amongst drain voltages of input side transistors of the plurality of current mirror circuit sections.

20. The electronic device as claimed in claim 6,
wherein the voltage comparison circuit section is configured to compare drain voltages of output side transistors of the plurality of current mirror circuit sections, and select and output a lowest drain voltage of the drain voltages of the output side transistors of the plurality of current mirror circuit sections,
wherein the signal comparison circuit section is configured to compare drain voltages of input side transistors of the plurality of current mirror circuit sections, and select and output a highest drain voltage of the drain voltages of the input side transistors of the plurality of current mirror circuit sections, and
wherein the constant voltage circuit section is configured to generate the constant voltage such that the lowest drain voltage output from the voltage comparison circuit section is equal to the highest drain voltage output from the signal comparison circuit section.

* * * * *